US008660025B2

(12) United States Patent  (10) Patent No.: US 8,660,025 B2
Lin et al.  (45) Date of Patent: Feb. 25, 2014

(54) ACCURATE METHOD TO EVALUATE A SYSTEM RELIABILITY OF A CLOUD COMPUTING NETWORK

(75) Inventors: Yi-Kuei Lin, Taipei (TW); Ping-Chen Chang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 571 days.

(21) Appl. No.: 12/929,141

(22) Filed: Jan. 4, 2011

(65) Prior Publication Data

US 2012/0079089 A1 Mar. 29, 2012

(30) Foreign Application Priority Data

Sep. 29, 2010 (TW) ................................ 99132959 A (51) Int. Cl.
 *H04J 3/14* (2006.01)
(52) U.S. Cl.
 USPC ........................................ 370/252; 370/248
(58) Field of Classification Search
 USPC .................................................. 370/252, 248
 See application file for complete search history.

(56) References Cited

U.S. PATENT DOCUMENTS 5,798,939 A * 8/1998 Ochoa et al. .................. 700/286
8,121,042 B2 * 2/2012 Wang et al. ................... 370/248
2009/0290591 A1 11/2009 Zhang et al.
2009/0323539 A1 12/2009 Wang et al.
2012/0113815 A1 * 5/2012 Zhang et al. .................. 370/242

FOREIGN PATENT DOCUMENTS

TW 2010 01184 A 1/2010

OTHER PUBLICATIONS

Office Action dated Sep. 23, 2013, issued in corresponding Taiwan application No. 099132959.

* cited by examiner

*Primary Examiner* — Albert T Chou
(74) *Attorney, Agent, or Firm* — Bacon & Thomas, PLLC (57) ABSTRACT

An accurate method, which is utilized to evaluate a system reliability of a cloud computer network, is disclosed. The cloud computer network includes a plurality of arcs. Each arc has a current capacity, and the current capacities are arranged to form a plurality of capacity vectors corresponding to several states of the cloud computer network. The steps of the method includes: providing a total demand, a time constraint and a budget constraint; defining a first vector group, including the capacity vectors satisfying the total demand and the time constraint; executing an adjustment procedure to change the capacity vectors unsatisfying into satisfying the budget constraint; defining a second vector group according to the result of the adjustment procedure, including the capacity vectors satisfying the total demand, the time constraint and the budget constraint; and calculating a probability according to the second vector group and defining the probability as the system reliability.

8 Claims, 4 Drawing Sheets

ACCURATE METHOD TO EVALUATE A SYSTEM RELIABILITY OF A CLOUD COMPUTING NETWORK

BACKGROUND OF THE INVENTION (1) Field of the Invention

The invention relates to an accurate method to evaluate a system reliability, and especially relates to an accurate method considering the maintenance budget to evaluate a system reliability of a cloud computing network.

(2) Description of the Prior Art

The cloud computing network (CCN) is gradually matured in relation to development and application of information and communication, so the performance evaluation is necessary to guaranty the CCN for keeping a good quality of service (QOS). The cloud is structured by powerful servers to compute a large number of data and to provide the storage. The client storage or utilize the data from the cloud through the CCN and the operating processes are implemented over the interne.

For guarantying a good QOS, the CCN should provide enough capacity for satisfying the client's demand. Furthermore, the transmission time or the delay time through the path should be the shortest so the transmission time for the cloud computing network is decreased while sending data from the cloud to the client. Otherwise, the cloud computing network might be in the failed state due to failed arcs or maintenance action, so the maintenance cost as the overall cost of restoring a network from the failed state back to the original state should be considerable, where the original state is the highest capacity of each arc. Consequently, the factors to consider includes the path selection, the load capacity and the transmission time while evaluating the performance of the cloud computing network.

However, there are less records for providing the specific method with considering the maintenance cost to evaluate the performance of the cloud computing network.

SUMMARY OF THE INVENTION

Accordingly, the object of the invention is to provide an accurate method to evaluate a system reliability, which is the probability of the cloud computing network transmitting a specific demand with considering the maintenance budget and the time constraint.

In one aspect, the invention provides an accurate method to is evaluate a system reliability of a cloud computer network, executed by a computer providing a network model. Wherein the computer is connected with a storage media and an operating unit through the cloud computing network. The network model includes a plurality of arcs, and each arc has a current capacity. The current capacities are arranged to form a plurality of capacity vectors corresponding to several states of the cloud computer network. The accurate method includes the steps of: providing a total demand, a time constraint and a maintenance budget into the network model and storing the total demand, the time constraint and the maintenance budget in the storage media; the operating unit defining a first vector group, which includes the capacity vectors satisfying the total demand and the time constraint, and comparing the value between every two capacity vectors in the capacity vectors satisfying the total demand and the time constraint, and removing the larger capacity vector of the two capacity vectors; the operating unit executing an adjustment procedure to change the capacity vectors unsatisfying into satisfying the maintenance budget in the first vector group; defining a second vector group according to the result of the adjustment procedure, the second vector group including the capacity vectors satisfying the total demand, the time constraint and the maintenance budget, and comparing the value between every two capacity vectors in the second vector group, and removing the larger capacity vector of the two capacity vectors; the operating unit calculating a probability according to the second vector group and defining the probability as an accurate value of the system reliability; and displaying the accurate value on an spreadsheet outputting from the computer.

In an preferred embodiment, the adjustment procedure includes the steps of: the operating unit adding a standard basis vector to each of the is capacity vectors unsatisfying the maintenance budget in the first vector group, so as to form a first capacity vector in the first vector group; judging if the first capacity vector satisfying the maintenance budget; adding another standard basis vector to the first capacity vector if unsatisfying the maintenance budget; and the operating unit repeating said steps to make the first capacity vector satisfy the maintenance budget.

In an preferred embodiment, the steps of judging if the first capacity vector satisfying the maintenance budget includes: removing the first capacity vector if one of the current capacities of the first capacity vector being larger than a corresponding maximal capacity.

In an preferred embodiment, the arcs are arranged to form at least two paths, each of the two paths has a load capacity, and the steps of providing the time constraint into the network model includes: providing a maximum time into the network model; distributing the total demand into the two paths to obtain two allocated demands corresponding to the two paths; defining each of the arcs of the two paths having a lead time in relation to the length of the arc; for each of the paths, adding the result of the allocated demand divided by the load capacity and the sum of the lead times up to get a transmission time; and defining the transmission time smaller than or equal to the maximum time.

In an preferred embodiment, the steps of providing the maintenance budget into the network model includes: providing a maximum budget and a maximal capacity of each of the arcs into the network model; storing an unit maintenance cost of each of the arcs in the storage media, wherein the unit maintenance cost is defined as the cost of raising one unit capacity for each of the arcs; the operating unit computing a difference between the current capacity and the maximal capacity for each of the arcs; the unit maintenance cost multiplied by the difference to obtain a maintenance cost of each of the arcs; adding the maintenance costs of the arcs up to obtain a total maintenance cost of the cloud computing network; and defining the total maintenance cost smaller than or equal to the maximum budget.

The discrepancies between the invention and the conventional are the invention considering the maintenance budget for the cloud computing network, considering the data delivery through multiple paths and providing a branch-and-bound algorithm for the system reliability.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with is reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
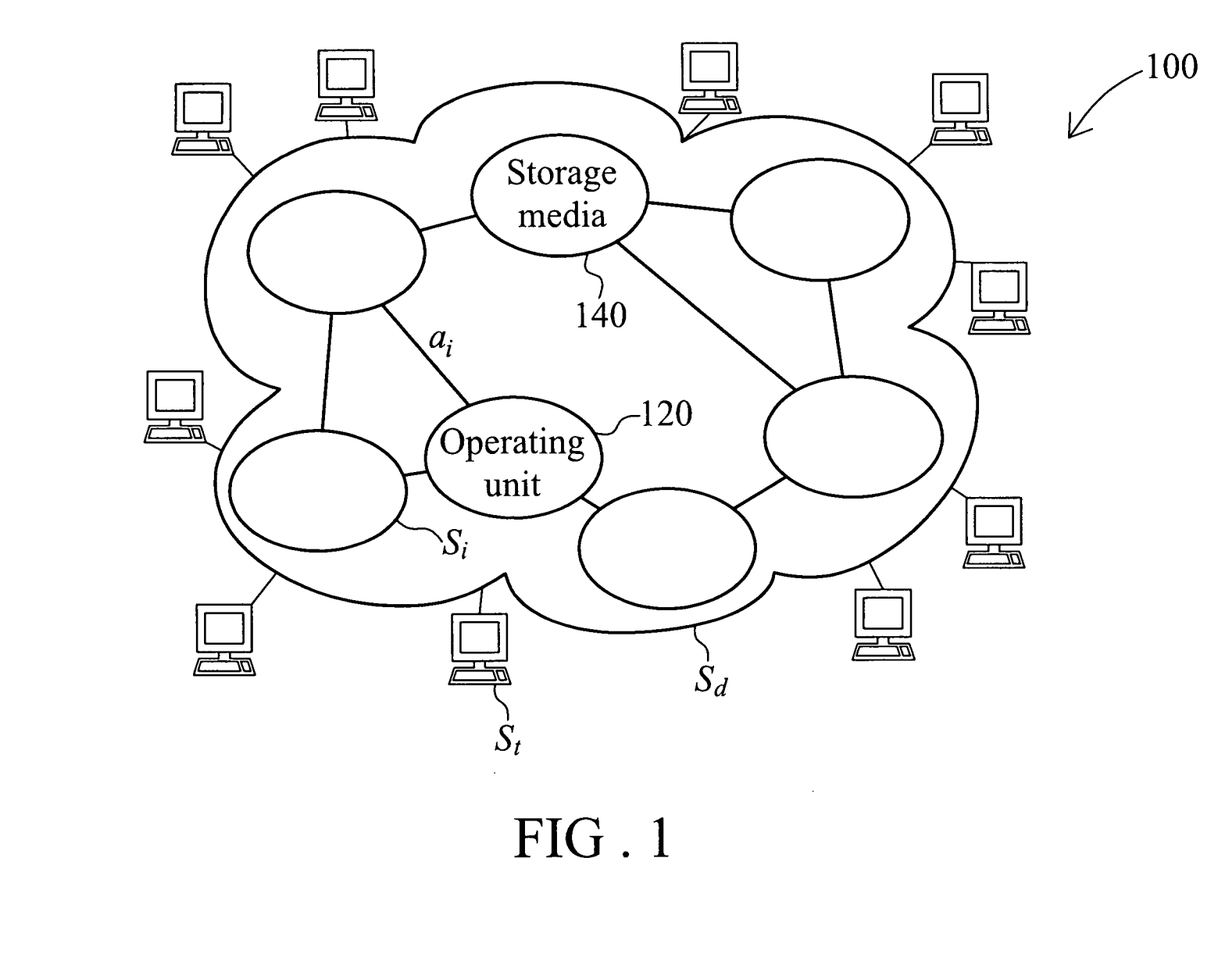
FIG. 1 is a schematic view of the cloud computing network.

A cloud of the cloud computing network (CCN) is regarded as a source node of the network model, and a client is regarded as a sink node. Refer to FIG. 1 for a schematic view of the cloud computing network. The cloud computing network 100 includes a cloud $S_d$ and a client $S_r$. The cloud $S_d$ includes an operating unit 120 and a storage media 140. The client $S_r$ includes a computer connected with the operating unit 120 and the storage media 140 through the cloud computing network.

Figure 2:
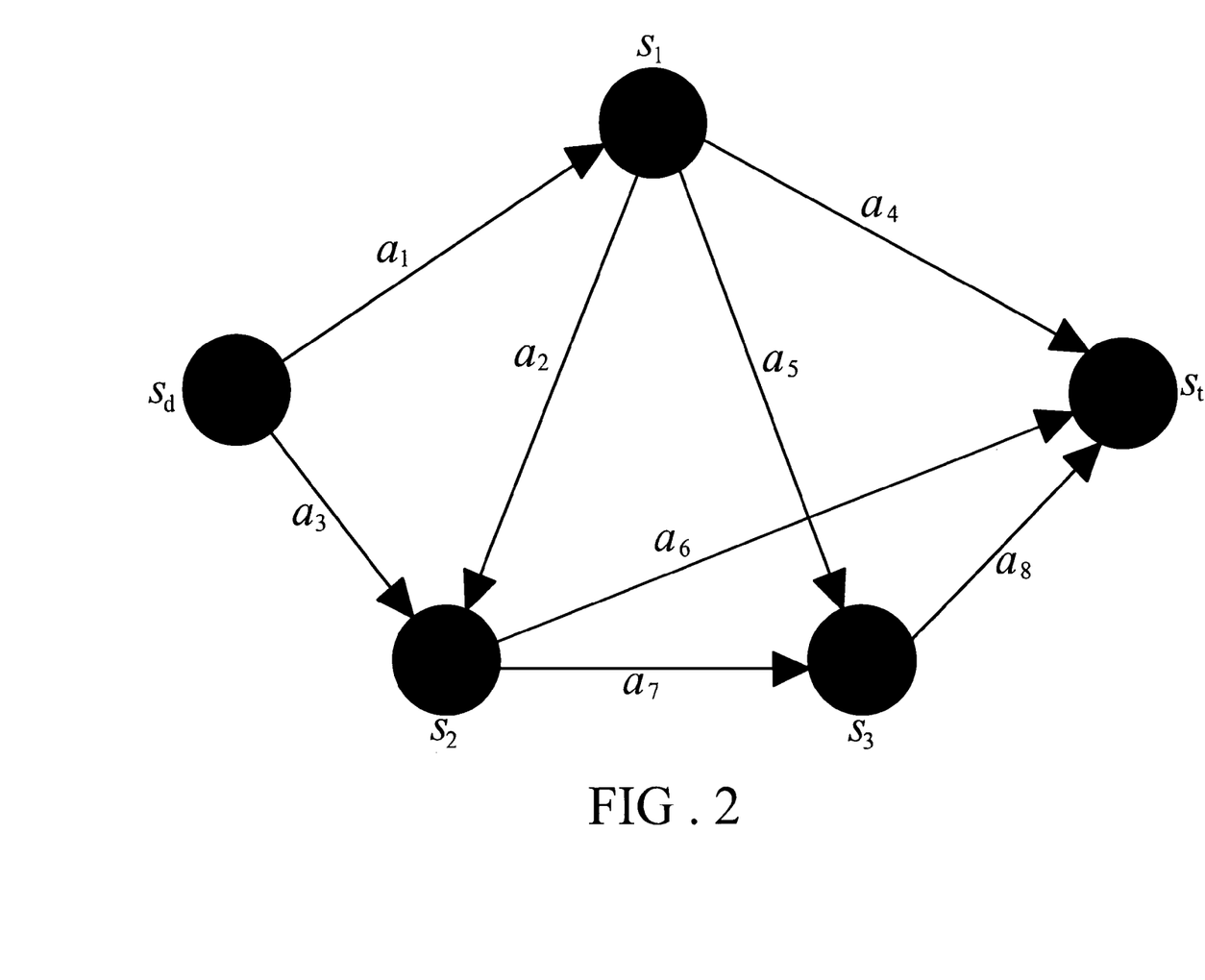
FIG. 2 is a schematic view of the network model for the cloud computing network.

Refer to FIG. 2 for a schematic view of the network model for the cloud computing network 100. The network model G is able to be disposed on any node $S_i$ such as the computer or the client $S_r$ of the network of FIG. 1 and utilized to evaluate a system reliability of the cloud computing network 100. Furthermore, the branch-and-bound approach is utilized to obtain an accurate value of the system reliability. The system reliability is regarded as the performance index.

The network model G includes a plurality of nodes $S_i$ and a plurality of arcs $a_i$. The node $S_i$ is such as the server or the switch, and the arc $a_i$ is such as the physical line, the fiber optic or the coaxial cable. The node $S_i$ includes the cloud $S_d$ and the client $S_r$, and the cloud is regarded as the source node of the cloud computing network and the client is regarded as the sink node of the cloud computing network. Each arc $a_i$ connects two nodes $S_i$ and the arcs $a_i$ are arranged to form at least two paths $P_j$. For example, the arcs $a_1$ and $a_4$ are arranged to form a first path, and the arcs $a_3$, $a_7$ and $a_8$ are arranged to form a second path. Each path $P_j$ is a minimal path, and $P_j$ denotes the jth minimal path for j=1, 2, . . . , m, where m is the numbers of the minimal path. The minimal path is an ordered set of the edges $e_i$ between the source and the sink and no loops is in the ordered set.

Let the network model G=(N, A, L, C) be a CCN, wherein N={$S_i$|i=1, 2, . . . , n} represents the set of the nodes, A={$a_i$|i=1, 2, . . . , n} represents the set of the arcs, L={$l_i$|i=1, 2, . . . , n} with $l_i$ represents the lead time of the arcs $a_i$, which is process time or transmission time for data deliver through the arc $a_i$ so valued in relation to the length of the arc $a_i$, and C={$c_i$|i=1, 2, . . . , n} with $c_i$ represents the per unit maintenance cost of the arcs $a_i$.

The capacity of each arc $a_i$ is stochastic for the cloud computing network 100. Hence, each arc $a_i$ includes multiple possible capacities. According to the capacity that each arc is able to provide, the cloud computing network 100 is multi-stated. A capacity vector X=($x_1$, $x_2$, . . . , $x_n$) is defined as different states of the network model G wherein $x_i$ represents the current capacity of arc $a_i$. The unit maintenance cost is defined as the cost of raising one unit capacity for each arc $a_i$.

Vector operations are defined as follows:

Y≥X ($y_1$, $y_2$, . . . , $y_n$)≥($x_1$, $x_2$, . . . , $x_n$): $y_i$≥$x_i$ for each i=1, 2, . . . , n;

Y>X ($y_1$, $y_2$, . . . , $y_n$)>($x_1$, $x_2$, . . . , $x_n$): Y≥X and $y_i$>$x_i$ for at least one i.

For keeping a good quality of service (QOS), the cloud computing network 100 must maintain the state to satisfy the demand d. When the state of the cloud computing network 100 is for just satisfying the exact demand d, the cloud computing network 100 must be restored from the original state to an optimal state. Meanwhile, each arc $a_i$ has a maximal capacity $M_i$ corresponding to the current capacity $x_i$, and a maximal capacity vector M=($M_1$, $M_2$, . . . , $M_n$) is formed. Consequently, the total maintenance cost is defined as the overall cost for restoring the cloud computing network 100 from the original state for satisfying the exact demand d back to the optimal state.

The maintenance cost of each arc $a_i$ is computed with the restored capacity. In the cloud computing network 100, the total cost to maintain the arc $a_i$ being at the state X is $$F(X) = \sum_{a_i \in P_j} c_i(M_i - x_i), \qquad (1)$$

where $c_i(M_i-x_i)$ is the maintenance cost for each arc $a_i$ on the minimal path $P_j$ to restore from the current capacity $x_i$ to the corresponding maximal capacity $M_i$. The data is synchronously delivered through multiple paths for meeting the restriction of the transmission time. For a system supervisor, the feasible capacity vector X, satisfying the time constraint T(X)≤T and the maintenance budget F(X)≤B, must be picked. For instance, the current capacity vector X=(1,0,1,1,0,0,1,1), the maximal capacity vector M=(3,3,3,1,2,4,5,4), and the per unit maintenance cost C=(25,15,25,40,20,15,40,30). If the current capacities $x_1$, $x_3$, $x_4$, $x_7$, and $x_8$ are on the minimal path, the total maintenance cost to restore from the state X is F(X)=$c_1(M_1-x_1)$+$c_3(M_3-x_3)$+$c_4(M_4-x_4)$+$c_7(M_7-x_7)$+$c_8(M_8-x_8)$=25(3−1)+25(3−1)+40(1−1)+40(5−1)+30(4−1)= 350.

In an embodiment, only the arcs $a_i$ appearing in two minimal paths are necessary to be maintained. The following constraint states that the total maintenance cost is able to satisfy the maintenance budget, $$\sum_{e_i \in P_j} c_i(W_i - x_i) \le B. \quad (2)$$

For each minimal path $P_j = \{a_{j1}, a_{j2}, \ldots, a_{jn_j}\}$, $j=1, 2, \ldots, m$, the maximal capacity of the minimal path $P_j$ is $$\min_{1 \le k \le n_j} (M_{jk}),$$

where $n_j$ is the number of the edges in the minimal path $P_j$. Similarly, under the state X, the capacity of the minimal path $P_j$ is $$\min_{1 \le k \le n_j} (x_{jk}).$$

The transmission time to send the demand d units of data through the minimal path $P_j$ under the state X, $\lambda(d,X)$, is $$\text{lead time of } P_j + \left\lceil \frac{d}{\text{the capacity of } P_j} \right\rceil = \sum_{k=1}^{n_j} l_{jk} + \left\lceil \frac{d}{\min_{1 \le k \le n_j} x_{jk}} \right\rceil, \quad (3)$$

where $\lceil x \rceil$ is the smallest integer such that $\lceil x \rceil \ge x$.

Figure 3:
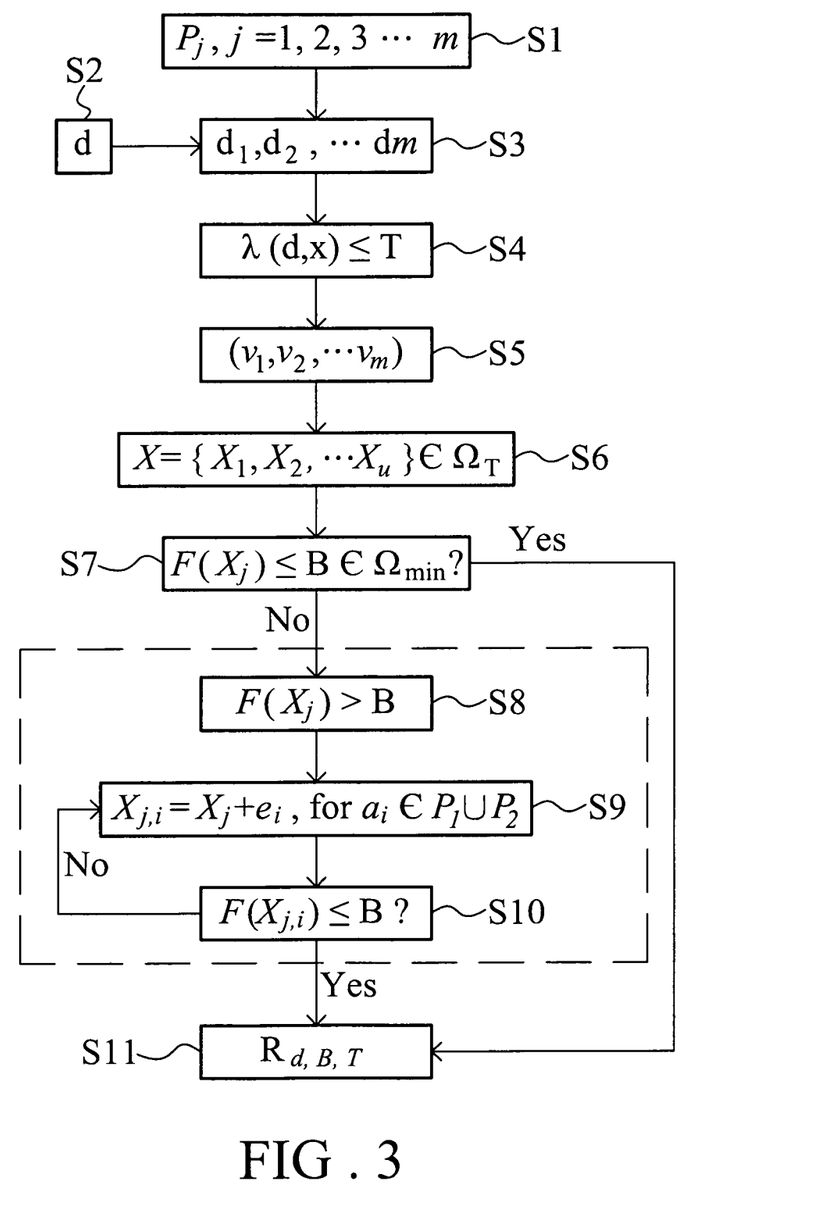
FIG. 3 is a chart showing an accurate method to evaluate a system reliability of a cloud computing network.

Refer to FIG. 3 for a chart showing an accurate method to evaluate the system reliability of the cloud computing network. The steps of the accurate method are described as below.

Step (S1): select a plurality of paths $P_j$ for synchronously transmitting data;

Step (S2): input a demand d into the network model and store the demand in the storage media 140;

Step (S3): distribute the demand d to at least two paths $P_1$ and $P_2$ for getting two allocated demands $d_1$ and $d_2$ respectively corresponding to two paths $P_1 = \{a_1, a_2, \ldots, a_q\}$ and $P_2 = \{a_{q+1}, a_{q+2}, \ldots, a_{q+r}\}$, wherein the sum of the allocated demands is the demand $d_1 + d_2 = d$;

Step (S4): input a maximum time T to provide a time constraint $\lambda(d,X) \le T$ into the network model G, wherein the time constraint includes the relational operators of the allocated demand $d_1$ (or $d_2$), the load capacity $v_1$ (or $v_2$) of each path $P_1$ (or $P_2$) and the maximum time T;

According to said formula (3), the steps of providing the time constraint $\lambda(d,X) \le T$ further includes: define each of the arcs $a_{j1}$ (and $a_{j2}$) of the two paths $P_1$ and $P_2$ having a lead time $l_{i1}$ (and $l_{i2}$); add the result of each allocated demand $d_1$ (or $d_2$) divided by the load capacity $v_1$ (or $v_2$) in the corresponding path $P_1$ (or $P_2$) and the lead time $l_{i1}$ (and $l_{i2}$) up to obtain the transmission time $\lambda(d,X)$; and define that the transmission time $\lambda(d,X)$ is smaller than or equals to the maximum time T:

$$\lambda(d_1, X) = \sum_{k=1}^{q} l_k + \left\lceil \frac{d_1}{\min_{1 \le k \le q} M_k} \right\rceil \le T,$$

for the allocated demand $d_1$, and $$\lambda(d_2, X) = \sum_{k=q+1}^{q+r} l_k + \left\lceil \frac{d_2}{\min_{q+1 \le k \le q+r} M_k} \right\rceil \le T,$$

for the allocated demand $d_2$;

Step (S5): compute the load capacity $v_1$ (or $v_2$) of the path $P_1$ (or $P_2$) according to the time constraint $\lambda(d,X) \le T$ and the allocated demand $d_1$ (or $d_2$), and obtain a minimal capacity $v_1$ (or $v_2$) in the preferred embodiment;

Step (S6): transform a current capacity $x_i$ of each arc $a_i$ from the load capacity; arrange the current capacities $x_i$ to form a plurality of capacity vectors $X = \{X_1, X_2, \ldots, X_u\}$ corresponding to different state of the network model G, wherein the capacity vectors satisfy the total demand and the time constraint; and compare the value between every two capacity vectors X, and remove the larger capacity vector of the two capacity vectors X, wherein the other capacity vectors X are called as a first vector group $\Omega_T$.

Step (S7): input a maximum budget B into the network model G and store the unit maintenance cost $c_i$ of each arc $a_i$ in the storage media 140 to provide a maintenance budget $F(X) \le B$; and judge if the capacity vectors X of the first vector group $\Omega_T$ satisfying the maintenance budget, wherein the maintenance budget includes the relational operators of the current capacity $x_i$, the unit maintenance cost $c_i$ and the maintenance budget B;

According to said formula (1) and (2), the steps of providing the maintenance budget $F(X) \le B$ includes: define a maximal capacity $M_i$ of each arc $a_{j1}$ (or $a_{j2}$); compute a difference between the current capacity $x_i$ and the maximal capacity $M_i$ for each arc $a_{j1}$ (or $a_{j2}$); utilize the unit maintenance cost $c_i$ multiplied by the difference to obtain a maintenance cost F(X) of each arc $a_i$; add all the maintenance costs F(X) of the arcs $a_{j1}$ and $a_{j2}$ up to obtain a total maintenance cost TF(X); and define that the total maintenance cost TF(X) is smaller than or equals to the maximum budget B:

$$TF(X_j) = \sum_{a_i \in P_j} c_i(M_i - x_i) \le B;$$

Wherein, the capacity vectors $X_j$ satisfying the maintenance budget in the first vector group are defined as the second vector group $\Omega_{min}$, and stored in the storage media 140 for the step (S11) executed to compute.

Figure 4:
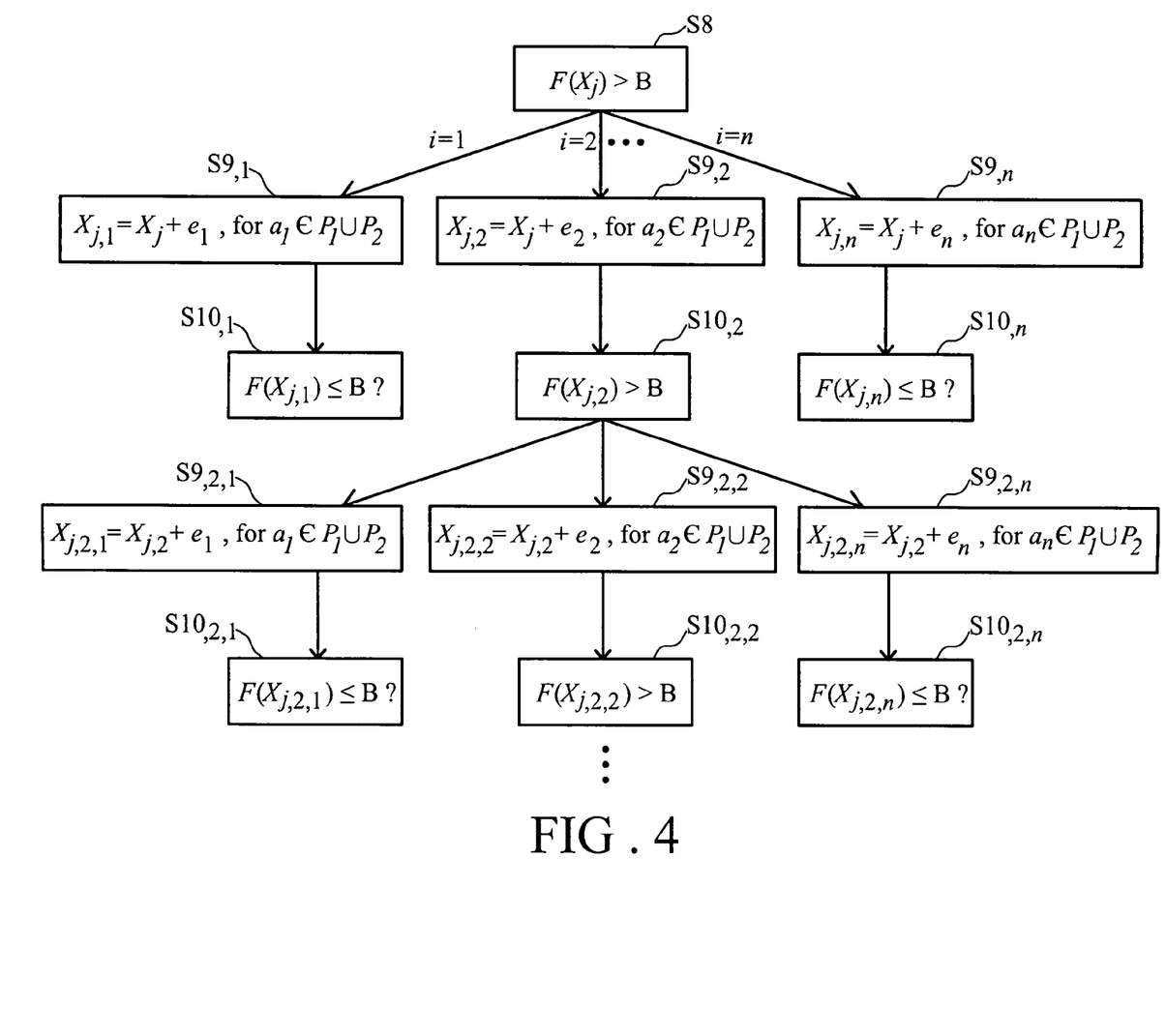
FIG. 4 is a chart showing a search tree for the branch-and-bound approach.

Step (S8): execute an adjustment procedure, which includes the step (S9) to the step (S10), for the capacity vectors satisfying the time constraint $\lambda(d,X) \le T$ and unsatisfying the maintenance budget $F(X) \le B$ in the first vector group; in other words, the operation between the capacity vectors and the maintenance budget is $F(X_j) > B$;

Step (S9): for $a_i \in P_1 \cup P_2$, add a standard basis vector $e_i$ to each of the capacity vectors $X_j$ of the first vector group $\Omega_T$ unsatisfying the maintenance budget to form a first capacity vector $X_{j,i} = X_j + e_i$ by the operating unit 120, wherein the values of the standard basis vector are composed of 1 and 0, and the value on the certain arc is set as 1 and the values on the other arcs are set as 0 while the certain one of the arcs is on the path;

Step (S10): judge if the first capacity vector $X_{j,i}$ satisfying the maintenance budget $F(X_{j,i}) \leq B$; go back to the step (S9) and add another standard basis vector $e_i$ to the first capacity vector $X_{j,i}$ if unsatisfying the maintenance budget; else if, remove the first capacity vector while the current capacity $x_i$ on the certain arc is lager than the corresponding maximal capacity $M_i$;

Refer to FIG. 4 for a chart showing a search tree for the branch-and-bound approach to adjust the capacity vectors unsatisfying the maintenance budget. The capacity vector $X_j$, unsatisfying the maintenance budget $F(X_j) > B$, is added to the standard basis vector $e_i$ to form the first capacity vector $X_{j,i}$: $X_{j,1} = X_j + e_1$, $X_{j,2} = X_j + e_2 \ldots X_{j,n} = X_j + e_n$, as the step $(S9_{,1})$ to the step $(S9_{,n})$; judge if the first capacity vector $X_j$ satisfying the maintenance budget: $F(X_{j,i}) \leq B$; if the first capacity vectors $X_{j,1}$ and $X_{j,n}$ satisfying the maintenance budget as the step $(S10_{,1})$ and the step $(S10_{,n})$, remove the first capacity vector $X_{j,1}$ while the current capacity $x_2$ on the second arc is lager than the corresponding maximal capacity $M_2$; if the first capacity vector $X_{j,2}$ unsatisfying the maintenance budget, add another standard basis vector $e_i$ to the first capacity vector $X_{j,2}$ to form the first capacity vector $X_{j,1,j}$: $X_{j,2,1} = X_{j,2} + e_1$, $X_{j,2,2} = X_{j,2} + e_2 \ldots X_{j,2,n} = X_{j,2} + e_n$, as shown in step $(S9_{,2,1})$ to step $(S9_{,2,n})$; judging if the first capacity vector $X_{j,I,j,d}$ satisfying the maintenance budget;

Adjust the capacity vectors unsatisfying the maintenance budget in the first vector group $\Omega_T$ by step (S9) to step (S10) until satisfying the maintenance budget, reserve the satisfying first capacity vector $X_{j,i}$ after adjusted, and remove the unsatisfying capacity vector.

Step (S11): define a second vector group $\Omega_{min}$ according to the result of the adjustment procedure, the second vector group $\Omega_{min}$ including the capacity vectors $X_j$ and the first capacity vector $X_{j,i}$, of satisfying the total demand, the time constraint and the maintenance budget; compare the value between every two capacity vectors in the second vector group $\Omega_{min}$ including the capacity vectors $X_j$ and the first capacity vector $X_{j,i}$, and remove the larger capacity vector of the two capacity vectors, the rest being the lower boundary vector (d,B,T)-MPs satisfying the time constraint and the maintenance budget; calculate a probability $R_{d,B,T}$ according to the lower boundary vector (d,B,T)-MPs of the second vector group and defining the probability $R_{d,B,T}$ as an accurate value of the system reliability; and finally display the accurate value on an spreadsheet outputting from the computer of the cloud computing network 100. The accurate value of the system reliability is measured for actual performance of the cloud computing network.

With considering the maintenance budget B, the total demand d is send from the cloud $S_d$ to the client $S_t$ within time constraint. For satisfying the time constraint, the data is delivered through multiple paths. The system supervisor obtains the accurate value of the system reliability by the below procedures. Firstly, find the first vector group satisfying the time constraint, and select the capacity vectors unsatisfying the maintenance budget among the first vector group; secondly, execute an adjustment procedure for the capacity vectors unsatisfying the maintenance budget by the branch-and-bound algorithm and the standard basis vector $e_i$ added; obtain all the capacity vectors satisfying the total demand, the time constraint and the maintenance budget to form the second vector group; and finally compute the accurate value of the system reliability according to the second vector group.

In an preferred embodiment, each arc of the cloud computing network 100 is combined with several optical carrier lines where each optical carrier line provides two capacities, 1 Gbps (giga bits per second) and 0 bps. The optical carrier lines are provided by different suppliers, so the capacity of the arc has different probability distributions. The capacity $x_i$, lead time $l_i$, and per unit maintenance cost $c_i$ of each arc $a_i$ are shown in table 1.

TABLE 1

The arc data of FIG. 2

| Arc | Cost | Lead time (sec) | Capacity (Gbps) | | | | | |
|---|---|---|---|---|---|---|---|---|
| | | | 0 | 1 | 2 | 3 | 4 | 5 |
| $a_1$ | 25 | 2 | 0.000659 | 0.020731 | 0.217562 | 0.761048 | 0.000000$^a$ | 0.000000 |
| $a_2$ | 15 | 1 | 0.000405 | 0.015212 | 0.190360 | 0.794023 | 0.000000 | 0.000000 |
| $a_3$ | 25 | 3 | 0.000405 | 0.015212 | 0.190360 | 0.794023 | 0.000000 | 0.000000 |
| $a_4$ | 40 | 3 | 0.087000 | 0.913000 | 0.000000 | 0.000000 | 0.000000 | 0.000000 |
| $a_5$ | 20 | 1 | 0.007569 | 0.158862 | 0.833569 | 0.000000 | 0.000000 | 0.000000 |
| $a_6$ | 15 | 2 | 0.000057 | 0.002405 | 0.037856 | 0.264845 | 0.694837 | 0.000000 |
| $a_7$ | 40 | 2 | 0.000002 | 0.000139 | 0.003475 | 0.043481 | 0.272048 | 0.680855 |
| $a_8$ | 30 | 1 | 0.000030 | 0.001501 | 0.028173 | 0.235031 | 0.735265 | 0.000000 |

$^a$The arc does not provide this capacity.

The cloud $S_d$ have to send 6 giga bits of data to the client $S_t$ through two disjoint paths $P_1 = \{a_1, a_4\}$ and $P_2 = \{a_3, a_7, a_8\}$ within 9 seconds and under maintenance budget 320. It means that the cloud computing network 100 is falling to the failed state when the capacity is less than 6 Gb of the total demand. Therefore, the cloud computing network 100 is restored from state 6. The system reliability $R_{6,320,9}$ fulfilling demand, maintenance budget and time constraint is derived as follows.

Step 1. The largest demand $\overline{d_1}$ such that $$(l_1 + l_4) + \left\lceil \frac{\overline{d_1}}{\min\{M_1, M_4\}} \right\rceil \leq 9 \text{ is } \overline{d_1} = 4.$$

The largest demand $\overline{d_2}$ such that $$(l_3 + l_7 + l_8) + \left\lceil \frac{\overline{d_2}}{\min\{M_3, M_7, M_8\}} \right\rceil \leq 9 \text{ is } \overline{d_2} = 9.$$

Step 2. Generate all non-negative integer solutions of $d_1 + d_2 = d$ where $d_1 \leq \overline{d_1}$ and $d_2 \leq \overline{d_2}$. The feasible solutions $(d_1, d_2)$ are (4,2), (3,3), (2,4), (1,5), and (0,6).

Step 3. For the feasible solution $(d_1,d_2)=(4,2)$, do the following steps. The lead time of the path $P_1$ is $l_1+l_4=5$. Then $v_1=1$ is the smallest integer such that $$\left(5+\left\lceil\frac{4}{v_1}\right\rceil\right)\leq 9.$$

Similarly, the lead time of the path $P_2$ is $l_3+l_7+l_8=6$. Then $v_2=1$ is the smallest integer such that $$\left(6+\left\lceil\frac{2}{v_2}\right\rceil\right)\leq 9.$$

Then, the capacity vector is obtained:

$$X_i=(x_1,x_2,x_3,x_4,x_5,x_6,x_7,x_8)=(1,0,1,1,0,0,1,1).$$

Repeat said step to get all the capacity vectors; next, select the first vector group $\Omega_T$ fulfilling the time constraint among all the capacity vectors, and the result are shown in table 2.

TABLE 2

Results of step 3 in example

| $(d_1, d_2)$ | $(v_1, v_2)$ | X | $X_i \in \Omega_T$ or not | Remark |
|---|---|---|---|---|
| (4, 2) | (0, 1) | $X_1 = (1, 0, 1, 1, 0, 0, 1, 1)$ | Yes | — |
| (3, 3) | (1, 1) | $X_2 = (1, 0, 1, 1, 0, 0, 1, 1)$ | No | $X_2 \geq X_1$ |
| (2, 4) | (1, 2) | $X_3 = (1, 0, 2, 1, 0, 0, 2, 2)$ | No | $X_3 \geq X_5$ |
| (1, 5) | (1, 2) | $X_4 = (1, 0, 2, 1, 0, 0, 2, 2)$ | No | $X_4 \geq X_5$ |
| (0, 6) | (0, 2) | $X_5 = (0, 0, 2, 0, 0, 0, 2, 2)$ | Yes | — |

Step 4. For each capacity vector $X_j \in \Omega_T$, compute the maintenance cost and execute the adjustment procedure for the capacity vectors, unsatisfying the maintenance budget, of the arc $a_i \in P_1 \cup P_2$.

For the capacity vector $X_1$, the total maintenance cost is $F(X_1)=c_1(M_1-x_1)+c_3(M_3-x_3)+c_4(M_4-x_4)+c_7(M_7-x_7)$ $c_8(M_8-x_8)=25(3-1)+25(3-1)+40(1-1)+40(5-1)+30(4-1)=350$. Because the total maintenance cost $F(X_1)=350$ exceeds the maximum budget B=320, so the capacity vector $X_1$ is needed to be adjusted. The capacity vector is added a standard basis vector $e_i$ to form the first capacity vector $X_{1,i}=X_1+e_i$, for i=1, 3, 4, 7, 8, and all the first capacity vectors $X_{1,i}$ is obtained:

$X_{1,1}=X_1+e_1=(1,0,1,1,0,0,1,1)+(1,0,0,0,0,0,0,0)=(2,0,1,1,0,0,1,1)$;

$X_{1,3}=X_1+e_3=(1,0,1,1,0,0,1,1)+(0,0,1,0,0,0,0,0)=(1,0,2,1,0,0,1,1)$;

$X_{1,4}=X_1+e_4=(1,0,1,1,0,0,1,1)+(0,0,0,1,0,0,0,0)=(1,0,1,2,0,0,1,1)$;

$X_{1,7}=X_1+e_7=(1,0,1,1,0,0,1,1)+(0,0,0,0,0,0,1,0)=(1,0,1,1,0,0,2,1)$;

$X_{1,8}=X_1+e_8=(1,0,1,1,0,0,1,1)+(0,0,0,0,0,0,0,1)=(1,0,1,1,0,0,1,2)$.

Wherein, the current capacity $x_4=2$ of the fourth arc in the first capacity vector $X_{1,4}$ is larger than the maximal capacity $M_4=1$, so it is not feasible. Hence, the first capacity vector $X_{1,4}$ is removed. So, the first vector group after firstly adjusted becomes $\Omega_T'=\{X_{1,1}, X_{1,3}, X_{1,7}, X_{1,8}, X_5\}$. Treat the capacity vector $X_{1,1}$, $X_{1,3}$, $X_{1,7}$, and $X_{1,8}$ as the capacity vector $X_j$.

Next, for the capacity vector $X_{1,1}$, the total maintenance cost is $F(X_{1,1})=25(3-2)+25(3-1)+40(1-1)+40(5-1)+30(4-1)=325$. Because the total maintenance cost $F(X_{1,1})=325$ exceeds the maximum budget B=320, so the capacity vector $X_{1,1}$ is needed to be adjusted. The capacity vector $X_{1,1}$ is added a standard basis vector $e_i$ to form the first capacity vector $X_{1,1,i}=X_{1,1}+e_i$, for i=1, 3, 4, 7, 8, and all the first capacity vectors $X_{1,i}$ is obtained:

$X_{1,1,1}=X_{1,1}+e_1=(2,0,1,1,0,0,1,1)+(1,0,0,0,0,0,0,0)=(3,0,1,1,0,0,1,1)$;

$X_{1,1,3}=X_{1,1}+e_3=(2,0,1,1,0,0,1,1)+(0,0,1,0,0,0,0,0)=(2,0,2,1,0,0,1,1)$;

$X_{1,1,4}=X_{1,1}+e_4=(2,0,1,1,0,0,1,1)+(0,0,0,1,0,0,0,0)=(2,0,1,2,0,0,1,1)$;

$X_{1,1,7}=X_{1,1}+e_7=(2,0,1,1,0,0,1,1)+(0,0,0,0,0,0,1,0)=(2,0,1,1,0,0,2,1)$;

$X_{1,1,8}=X_{1,1}+e_8=(2,0,1,1,0,0,1,1)+(0,0,0,0,0,0,0,1)=(2,0,1,1,0,0,1,2)$.

Wherein, the current capacity $x_4=2$ of the fourth arc in the first capacity vector $X_{1,1,4}$ is larger than the maximal capacity $M_4=1$, so it is not feasible. Hence, the first capacity vector $X_{1,1,4}$ is removed. So, the first vector group after secondly adjusted becomes $\Omega_T''=\{X_{1,1,1}, X_{1,1,3}, X_{1,1,7}, X_{1,1,8}, X_{1,3}, X_{1,7}, X_{1,8}, X_5\}$. Treat the capacity vector $X_{1,1,1}$, $X_{1,1,3}$, $X_{1,1,7}$, and $X_{1,1,8}$ as the capacity vector $X_j$. Repeat said steps until the capacity vectors of the first vector group fulfilling the maintenance budget so as to form the second vector group $\Omega_{min}$. The results are concluded in table 3.

TABLE 3

Results of step 4 in example

| X | $X_{j,i} \in \Omega_{min}$ or not | Total Cost | Remark |
|---|---|---|---|
| $X_{1,1,1} = (3, 0, 1, 1, 0, 0, 1, 1)$ | Yes | 300 | — |
| $X_{1,1,3} = (2, 0, 2, 1, 0, 0, 1, 1)$ | Yes | 300 | — |
| $X_{1,1,4} = (2, 0, 1, 2, 0, 0, 1, 1)$ | No | — | $x_4 > M_4$ |
| $X_{1,1,7} = (2, 0, 1, 1, 0, 0, 2, 1)$ | No | — | $X_{1,1,7} \geq X_{1,7}$ |
| $X_{1,1,8} = (2, 0, 1, 1, 0, 0, 1, 2)$ | No | — | $X_{1,1,8} \geq X_{1,8}$ |
| $X_{1,3,1} = (2, 0, 2, 1, 0, 0, 1, 1)$ | No | — | $X_{1,3,1} \geq X_{1,1,3}$ |
| $X_{1,3,3} = (1, 0, 3, 1, 0, 0, 1, 1)$ | Yes | 300 | — |
| $X_{1,3,4} = (1, 0, 2, 2, 0, 0, 1, 1)$ | No | — | $x_4 > M_4$ |
| $X_{1,3,7} = (1, 0, 2, 1, 0, 0, 2, 1)$ | No | — | $X_{1,3,7} \geq X_{1,7}$ |
| $X_{1,3,8} = (1, 0, 2, 1, 0, 0, 1, 2)$ | No | — | $X_{1,3,8} \geq X_{1,8}$ |
| $X_{1,4} = (1, 0, 1, 2, 0, 0, 1, 1)$ | No | — | $x_4 > M_4$ |
| $X_{1,7} = (1, 0, 1, 1, 0, 0, 2, 1)$ | Yes | 310 | — |
| $X_{1,8} = (1, 0, 1, 1, 0, 0, 1, 2)$ | Yes | 320 | — |
| $X_5 = (0, 0, 2, 0, 0, 0, 2, 2)$ | Yes | 320 | — |

Step 5. Obtain the second vector group, $\Omega_{min}=\{X_{1,1,1}, X_{1,1,3}, X_{1,3,3}, X_{1,7}, X_{1,8}, X_5\}$, for fulfilling the total demand, the time constraint and the maintenance budget; compare the value between every two capacity vectors in the second vector group $\Omega_{min}$, and remove the larger capacity vector of the two capacity vectors, the rest being the lower boundary vector (6,320,9)-MPs so six (6,320,9)-MPs are generated: $B_{1,1,1}=\{X|X\geq X_{1,1,1}\}$, $B_{1,1,3}=\{X|X\geq X_{1,1,3}\}$, $B_{1,3,3}=\{X|X\geq X_{1,3,3}\}$, $B_{1,7}\{X|X\geq X_{1,7}\}$, $B_{1,8}=\{X|X\geq X_{1,8}\}$, and $B_5=\{X|X\geq X_5\}$; and calculate a probability according to the lower boundary vector and define the probability as an accurate value of the system reliability $R_{6,320,9}=\Pr\{B_{1,1,1}\cup B_{1,1,3}\cup B_{1,3,3}\cup B_{1,7}\cup B_{1,8}\cup B_5\}=0.99808897$. The system reliability is derived by applying the RSDP algorithm.

The accurate method to evaluate a system reliability of a cloud is computer network is satisfied for industry evaluation, so applied to the electronics, the system and the webs for attaching the performance evaluation. Especially, the adjustment procedure is utilized to get the accurate value of the system reliability by the branch-and-bound algorithm and the added standard basis vector. Therefore, the system supervisors executes the sensitive analysis to improve the performance of the cloud computing network.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An accurate method to evaluate a system reliability of a cloud computer network, executed by a computer providing a network model, wherein the computer is connected with a storage media and an operating unit through the cloud computing network, the network model comprises a plurality of arcs, each of the arcs has a current capacity, and the current capacities are arranged to form a plurality of capacity vectors corresponding to different states of the cloud computer network, the accurate method comprising the steps of:

providing a total demand, a time constraint and a maintenance budget into the network model and storing the total demand, the time constraint and the maintenance budget in the storage media;

the operating unit defining a first vector group, including the capacity vectors satisfying the total demand and the time constraint;

judging whether or not the capacity vectors of the first vector group satisfy the maintenance budget;

the operating unit executing an adjustment procedure to change the capacity vectors unsatisfying into satisfying the maintenance budget in the first vector group;

defining a second vector group including the changed capacity vectors and the original capacity vectors satisfying the maintenance budget in the first vector group, so the capacity vectors of the second vector group satisfy the total demand, the time constraint and the maintenance budget;

the operating unit calculating a probability according to the second vector group and defining the probability as an accurate value of the system reliability; and displaying the accurate value on an spreadsheet outputting from the computer.

2. The accurate method to evaluate the system reliability of the cloud computer network of claim 1, wherein the adjustment procedure comprises the steps of:

the operating unit adding a standard basis vector to each of the capacity vectors unsatisfying the maintenance budget in the first vector group, so as to form a first capacity vector in the first vector group;

judging if the first capacity vector satisfying the maintenance budget;

adding another standard basis vector to the first capacity vector if unsatisfying the maintenance budget; and the operating unit repeating said steps to make the first capacity vector satisfy the maintenance budget.

3. The accurate method to evaluate the system reliability of the cloud computer network of claim 2, wherein the steps of judging if the first capacity vector satisfying the maintenance budget comprise: removing the first capacity vector if one of the current capacities of the first capacity vector being larger than a corresponding maximal capacity.

4. The accurate method to evaluate the system reliability of the cloud computer network of claim 1, wherein the arcs are arranged to form at least two paths, each of the two paths has a load capacity, and the steps of providing the time constraint into the network model comprise:

providing a maximum time into the network model;

distributing the total demand into the two paths to obtain two allocated demands corresponding to the two paths;

defining each of the arcs of the two paths having a lead time in relation to the length of the arc;

for each of the paths, adding the result of the allocated demand divided by the load capacity and the sum of the lead times up to get a transmission time; and defining the transmission time smaller than or equal to the maximum time.

5. The accurate method to evaluate the system reliability of the cloud computer network of claim 1, wherein the steps of providing the maintenance budget into the network model comprise:

providing a maximal capacity of each of the arcs and a maximum budget into the network model;

storing an unit maintenance cost of each of the arcs in the storage media, wherein the unit maintenance cost is defined as the cost of raising one unit capacity for each of the arcs;

the operating unit computing a difference between the current capacity and the maximal capacity for each of the arcs;

the unit maintenance cost multiplied by the difference to obtain a maintenance cost of each of the arcs;

adding the maintenance costs of the arcs up to obtain a total maintenance cost of the cloud computing network; and defining the total maintenance cost smaller than or equal to the maximum budget.

6. The accurate method to evaluate the system reliability of the cloud computer network of claim 1, wherein the steps of defining the first vector group comprise: comparing the value between every two capacity vectors satisfying the total demand and the time constraint in the capacity vectors, and removing the larger capacity vector of the two capacity vectors.

7. The accurate method to evaluate the system reliability of the cloud computer network of claim 1, wherein the steps of defining the second vector group comprise: comparing the value between every two capacity vectors in the second vector group, and removing the larger capacity vector of the two capacity vectors.

8. The accurate method to evaluate the system reliability of the cloud computer network of claim 1, wherein the cloud computer network comprises a plurality of nodes, each of the arcs is connected between two of the nodes, the nodes comprises a source and a sink, and each of the paths is an ordered set of the arcs between the source and the sink and no loops is in the ordered set.

* * * * *